United States Patent [19]

Focqueur et al.

[11] Patent Number: 4,714,448

[45] Date of Patent: Dec. 22, 1987

[54] TORSIONAL DAMPER DEVICE

[75] Inventors: Hervé Focqueur, Franconville; Bernard Jumel, Pierrefitte, both of France

[73] Assignee: Valeo, Paris, France

[21] Appl. No.: 813,678

[22] Filed: Dec. 26, 1985

[30] Foreign Application Priority Data

Dec. 27, 1984 [FR] France .............................. 84 19877

[51] Int. Cl.$^4$ .............................................. F16D 3/12
[52] U.S. Cl. ..................................... 464/68; 192/106.2; 464/83
[58] Field of Search .......................... 192/106.1, 106.2; 464/66, 68, 83

[56] References Cited

U.S. PATENT DOCUMENTS

| 2,587,105 | 2/1952 | Bronzan | 464/83 X |
| 3,621,675 | 11/1971 | Conaghan et al. | 464/83 |
| 3,821,882 | 7/1974 | Eheim | 464/83 |
| 4,547,176 | 10/1985 | Loizeau | 464/68 |

FOREIGN PATENT DOCUMENTS

| 1575752 | 1/1970 | Fed. Rep. of Germany | 464/83 |
| 1352386 | 1/1964 | France . | |
| 1441294 | 4/1966 | France . | |
| 2119532 | 8/1972 | France . | |
| 2270491 | 12/1975 | France . | |
| 2557656 | 7/1985 | France . | |
| 131835 | 10/1981 | Japan | 192/106.1 |
| 1380940 | 1/1975 | United Kingdom | 464/83 |
| 2093951 | 9/1982 | United Kingdom . | |
| 2153489 | 8/1985 | United Kingdom | 464/68 |

Primary Examiner—Daniel P. Stodola
Attorney, Agent, or Firm—Charles E. Brown; Charles A. Brown

[57] ABSTRACT

In a torsional damper device with an elastic centering member, in particular for automotive vehicle clutches, two coaxial parts are disposed to rotate relative to each other against an elastic member which is adapted to return them to a rest mean position and which is a block of elastic material adapted to bear directly on corresponding shoulders on the coaxial parts concerned. The elastic member has a recess in the median area of each circumferential end.

15 Claims, 14 Drawing Figures

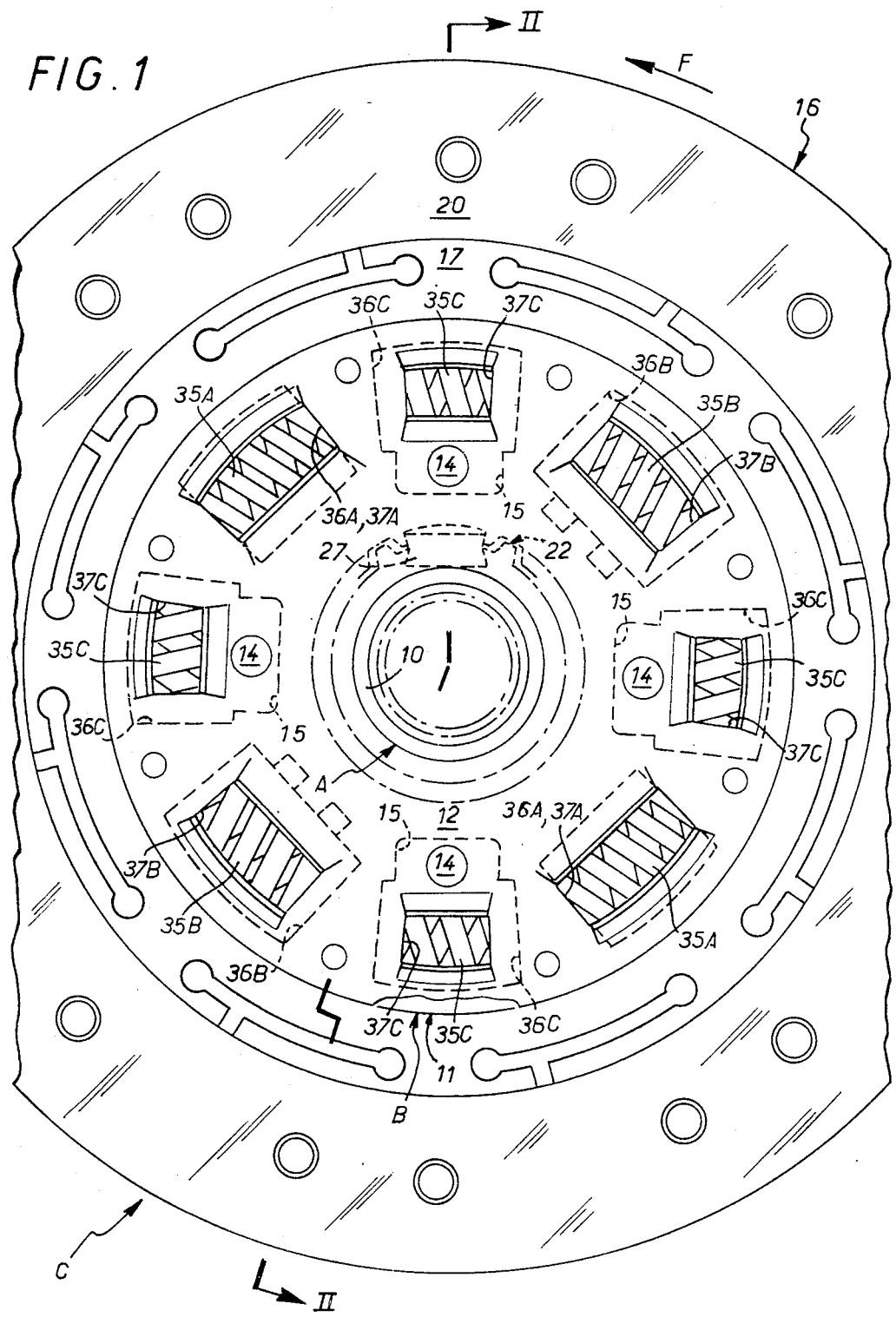

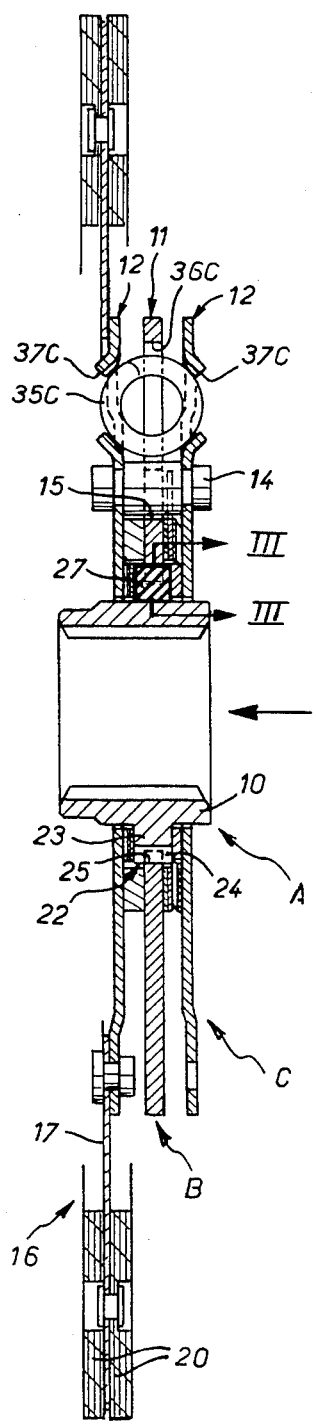
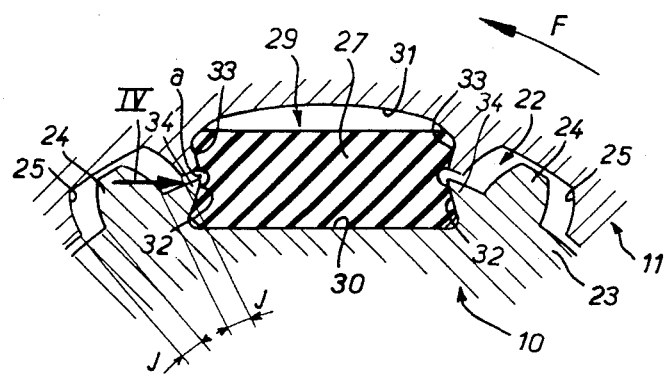
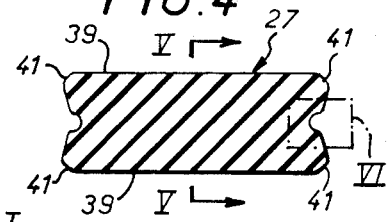
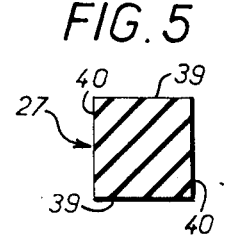
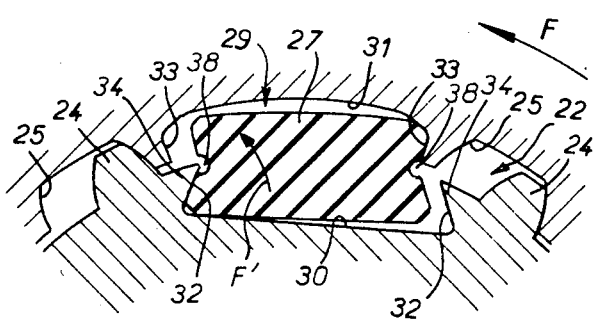
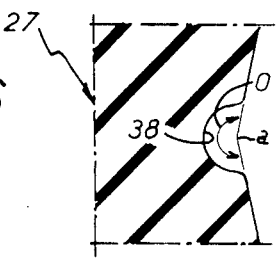

TORSIONAL DAMPER DEVICE

BACKGROUND OF THE INVENTION

1. Field of the Invention

The present invention generally concerns torsional damper devices.

2. Description of the Prior Art

There is described in the copending U.S. patent application Ser. No. 686,475 filed on Dec. 26, 1984 and assigned to the assignee of the instant application a torsional damper device for an automotive vehicle clutch, wherein at least two coaxial parts are mounted to rotate relative to each other against circumferentially acting elastic means disposed therebetween within limits of relative angular movement determined by meshing means with clearance provided between the coaxial parts in cooperation with centering means adapted to urge the coaxial parts in the circumferential direction towards an intermediate rest position between the limits of relative angular movement. The centering means comprises at least one elastic member constituting part of the circumferentially acting elastic means colocated with the meshing means with clearance of the coaxial parts and adapted, for the rest position of the latter, to bear at each of its circuferential ends against shoulders of the coaxial parts which are oblique to each other. The shoulders are thus oblique to each other as the flanks of a dovetail groove. The elastic member comprises a simple circumferentially elongate block of elastic material which is disposed chordally of the damper device. The circumferential ends of the elastic member are free of any covering and adapted to bear directly against the corresponding shoulders of the coaxial parts between which it is circumferentially disposed.

Surprisingly, and going completely against the usual provisions in this regard, it has been found that it is possible to make effective use for the necessary elastic member of a simple block of elastic material, without there being any systematic major risk of shearing or tearing of the block, although it then has to cooperate directly with shoulders each formed in practice by the edge of a metal flange, necessarily of reduced axial thickness.

This result is all the more surprising in that, on the one hand, for one of the coaxial parts at least both shoulders with which each of the two circumferential ends of an elastic material block must respectively cooperate are oblique relative to each other, in the manner of the flanks of a dovetail groove, and this results in the presence in this coaxial part of relatively sharp spurs each oriented in the direction towards the median area of the aforementioned circumferential ends, and in that, on the other hand, a block of this kind is called upon when in service to function essentially in shear and is therefore more especially stressed by the shoulders against which it is then engaged.

A general object of the present invention is to provide for various improvements to an elastic material block of this kind so as to further increase its service life and/or to improve its in-service operating conditions.

SUMMARY OF THE INVENTION

The present invention consists in a torsional damper device for an automotive vehicle clutch, wherein at least two coaxial parts are mounted to rotate relative to each other against circumferentially acting elastic means disposed therebetween within limits of relative angular movement determined by meshing means with clearance provided between the coaxial parts in cooperation with centering means adapted to urge the coaxial parts in the circumferential direction towards an intermediate rest position between the limits of relative angular movement, the centering means comprises at least one elastic member constituting part of the circumferentially acting elastic means colocated with the meshing means with clearance of the coaxial parts and adapted, for the rest position of the latter, to bear at each of its circumferential ends against shoulders of the coaxial parts which are oblique to each other, the shoulders are thus oblique to each other as the flanks of a dovetail groove, the elastic member comprises a simple circumferentially elongate block of elastic material which is disposed chordally of the damper device, the circumferential ends of the elastic member are free of any covering and adapted to bear directly against the corresponding shoulders of the coaxial parts between which it is circumferentially disposed, and the elastic member comprises at least one axial recess reducing its circumferential stiffness.

As a result of this axial recess, in service a block of this kind circumvents the correspondings spur of the coxial part featuring such spurs, with no risk of unwanted damage due to the block.

This favors its service life.

Other improvements may also be made in accordance with the present invention.

For example, there may be provided on one at least of the lateral sides of the block, between its circumferential ends, a recess so that in its median area a block of this kind has a section of reduced transverse cross-section.

As an alternative to this, the elastic member that this elastic material block constitutes featuring deep recesses originating in those of its lateral sides which each extend substantially tangentially relative to a circumference of the assembly, said deep recesses alternate in the circumferential direction from one of said sides to the other.

As a further alternative, the elastic material block in question comprising, between its lateral sides which extend substantially transversely relative to the axis of the assembly, at least one opening which passes completely through it substantially parallel to said axis, said opening extending substantially the same distance to each side of its median plane.

For example, an opening of this kind may feature, over part at least of its length, a circular contour in which case it is preferably flared outwardly at one end at least.

However, in one specific embodiment it has a transverse cross-section of generally polygonal contour the sides of which near the sides of the elastic member that the elastic material block in question constitutes are substantially parallel to the latter.

An arrangement of this kind advantageously favors parallelogram-fashion deformation of a block of this kind when in service, and this combines in a particularly felicitous manner with the fact that the latter operates in shear.

However, in all cases (recess or opening), it is advantageously possible to reconcile favorably two apparently contradictory requirements, one relating to the inherent hardness of the elastic material block employed, it naturally being desirable that this be relatively high in order to better withstand the loads applied to the block by the shoulders with which it cooperates, and the other relating to the stiffness of a block of this kind, which is advantageously relatively low, for good filtering of netural or idling noise.

The characteristics and advantages of the invention will emerge from the following description given by way of example with reference to the appended schematic drawings.

BRIEF DESCRIPTION OF THE DRAWINGS

FIG. 1 is a partial view in elevation of a torsional damper device in accordance with the invention seen in the direction of the arrow 1 in FIG. 2 and locally cut away.

FIG. 2 is a view of it in axial cross-section on the broken line II—II in FIG. 1.

FIG. 3 is a view of it to a larger scale in partial transverse cross-section on the line III—III in FIG. 2, for the rest position of the two coaxial parts concerned.

FIG. 4, which repeats part of FIG. 3, is a view in longitudinal cross-section of the elastic centering member employed in accordance with the invention in this torsional damper device, shown in isolation.

FIG. 5 is a view of this elastic centering member in transverse cross-section on the line V—V in FIG. 4.

FIG. 6 shows to a larger scale the detail of FIG. 4 marked by a box VI thereon.

FIG. 7 is a view analogous to that of FIG. 3, for another position of the coaxial parts concerned.

DESCRIPTION OF THE PREFERRED EMBODIMENTS

Figure 8:
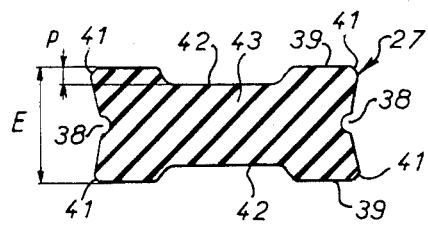
FIGS. 8 through 12 are views in longitudinal cross-section all analogous to that of FIG. 3 and relating to respective variant embodiments of the elastic centering member employed in the torsional damper device in accordance with the invention.

FIGS. 1 through 3 show a torsional damper device of the type described in copending U.S. patent application Ser. No. 686,745 filed on Dec. 26, 1984. The same components are designated by the same reference numbers as in that disclosure.

In brief, this torsional damper device, which is intended to constitute a clutch disk for a motor vehicle clutch, comprises in succession and mounted so as to rotate relative to one another in parts three coaxial parts namely a part A consisting of a hub 10, a part B consisting of a hub flange 11 surrounding the median part of the hub 10, and a part C consisting of two guide rings 12 which, disposed one on each side of the hub flange 11 and, like the latter, surrounding the hub 10, are attached to each other by spaced axial pegs 14 passing with clearance through openings 15 providing for this purpose in the hub flange 11, and one of which carries a friction disk 16 with flange 17 and friction facings 20.

The two coaxial parts A and B are mounted so as to be rotatable relative to each other against elastic means disposed circumferentially between them, for convenience referred to as circumferentially acting elastic means, and within limits of relative angular movement determined by meshing means 22 with clearance.

To constitute these, the hub flange 11 features on its inside periphery notches 25 by virtute of which it is engaged with clearance over radial teeth 24 on the outside surface of the hub 10, projecting from a peripheral ring 23.

Associated with the meshing means 22 with clearance are centering means adapted to urge the coaxial parts A and B in the circumferential direction towards an intermediate rest position between their limits of relative angular movement and which comprise at least one elastic member 27 constituting part of the circumferentially acting elastic means operative between the coaxial parts A and B.

In practice, this elastic member 27 of itself forms these circumferentially acting elastic means and is disposed in the area of the meshing means 22 with clearance, in a housing formed by two notches 30 and 31, the first between two teeth 24 of the hub 10 and the second between two notches 25 of the hub flange 11.

Each of the two notches 30 and 31 is delimited circumferentially at each end by a respective shoulder 32, 33.

The shoulders 32 of the notch 30, that formed between two teeth 24 of the hub 10, are each generally oblique relative to a radius of the assembly passing through their median area, so that they are thus generally obliquely disposed relative to each other, converging towards each other in the direction away from the axis of the assembly, like the flanks of a dovetail groove.

As will be noted, these shoulders 32 further define, together with the peripheral rim 23 of the hub 10 on which are situated the projecting teeth 24 thereof, spurs 34 extending generally circumferentially towards each other and which are relatively sharp.

The shoulders 33 of the notch 31, that formed between two notches 25 of the hub flange 11, each extend substantially radially.

However, given the oblique disposition of the shoulders 32 of the associated notch 30, the shoulders 32 and 33 thus forming overall the circumferential ends of the housing 29 for the elastic member 27 are generally oblique relative to each other at each of the circumferential ends of the housing 29, and thus form a dihedron.

As described in the aforementioned copending U.S. patent application Ser. No. 686,475, the elastic member 27 is a simple cylindrical block of elastic material elongate in the circumferential direction and substantially tangential relative to a circumference of the assembly, the circumferential ends of which, free of any covering, are adapted to abut directly against the shoulders 32, 33 of the coaxial parts A, B between which it is circumferentially disposed, these circumferential ends each forming to this effect a dihedral recess so as to conform to the shoulders 32, 33, the edge a of which recess extends substantially in the median area of this circumferential end.

By virtue of the dihedral configuration of these circumferential ends, the elastic material block is appropriately located in the radial direction at all times.

This applies in particular for the rest configuration of the assembly (FIGS. 1 and 3) in which its circumferential ends are engaged with both of the shoulders or flanks of the dovetail notch 30 in the hub 10.

Conjointly, the coaxial parts B and C are also mounted rotatably relative to each other, against elastic means disposed circumferentially between them and constituted in the embodiment shown by helical coil springs 35A, 35B and 35C which, as described in detail in the aforementioned copending U.S. patent application Ser. No. 686,475, extend substantially tangentially through a common circumference of the assembly, being housed in part in windows or openings 36A, 36B and 36C formed in the hub flange 11 and in part in windows or openings 37A, 37B and 37C formed in the guide rings 12.

According to one improvement in accordance with the present invention, the elastic member 27 has a recess in the median area of each circumferential end.

In practice, this recess 38 opens out the edge a of the corresponding dihedron.

In the embodiment shown, this recess 38 is generally semi-cylindrical, with its generatrices parallel to the axis of the assembly, and its transverse cross-section is of circular contour subtending an angle at the center O greater than 180° (FIG. 6).

Also, in the embodiment shown, the transverse cross-section of the cylinder that the elastic material constituting the elastic member 27 forms is generally rectangular.

In the longitudinal direction, this elastic member 27 thus features two parallel sides 39 which are generally flat and each of which extends substantially tangentially relative to a circumference of the assembly as well as, perpendicular to these, two lateral sides 40 which are also flat and each of which extends substantially transversely relative to said axis of the assembly (FIGS. 4 and 5).

In the embodiment shown, at each circumferential end of the elastic member 27 the sides which form the lateral sides 39 thereof with the dihedron constituting this circumferential end are each rounded off by a more or less accentuated bevel 41.

These bevels 41 are intended to favor in operation the achieving of appropriate bearing engagement of the elastic member 27 on the then relevant circumferential end of the notch 31 of its housing 29, these ends being rounded, and they therefore advantageously prevent it being expelled radially outwards.

Preferably, and as shown, such bevels are also provided at the edges of the lateral side of the elastic member 27 which is tangential to a circumference of the assembly and radially nearest the axis of the assembly, as well as at the edges of that side which is also tangential to a circumference of the assembly and radially farthest from said axis.

Thus the elastic member 27 can with advantage be fitted either way round.

In service, when torque is applied to the coaxial part C, for example in the direction shown by the arrow F in FIGS. 1, 3 and 7, initially only the elastic member 27 yields elastically until the teeth 24 of the hub 10 abut against the corresponding flank of the notch 25 of the hub flange 11 (FIG. 7).

As will be noted, when this happens the elastic member 27, which functions essentially in shear, is subject to a slight tilting movement as shown by the arrow F' in FIG. 7 about the spur 34 of the hub 10 against which it bears at this time.

However, by virtue of the recess 38 in its corresponding circumferential end, it is protected from any kind of indentation due to this spur 34, to the benefit of its service life.

Everything proceeds as if, by virtue of the recess 38, it extends around the end of this spur 34 whilst remaining in abutment engagement therewith, since the end of the spur 34 enters the recess 38.

As the torque to be transmitted increases, and when the springs 35A, 35B and 35C become operative in their turn, the elastic member 27 remains compressed. When the torque changes in the opposite sense, it exerts a return force between the coaxial parts A and B until they are returned to their intial mean rest position in which their respective shoulders 32 and 33 face each other.

In the foregoing description, the elastic material block constituting the elastic member 27 is solid and unapertured and its lateral sides 39 and 40 are flat and smooth.

A block of this kind, the hardness of which must be relatively high in order to be able to cooperate directly with the shoulders 32 and 33 of the coaxial parts A and B without risk of damage, would normally have a stiffness reflecting this hardness.

As an alternative to this, and according to improvements in accordance with the present invention, steps are taken to reduce its stiffness.

For example (FIG. 8), between its circumferential ends the elastic member 27 has on at least one of its lateral sides 39 and 40 a recess 42 such that in its median part it has a portion 43 of reduced transverse cross-section.

In practice, the elastic member 27 has a recess 42 on both of its lateral sides 39, each of which extends substantially tangentially to a circumference of the assembly.

In the embodiment shown this recess 42, which is of limited depth P, very much less than half the thickness E of the main part of the elastic member 27, extends over a significant fraction, in the order of one half, for example, of the length of the elastic member 27.

As an alternative to this (FIG. 9) the elastic member 27 has deep recesses 45 extending into it from each of its lateral sides 39 extending substantially tangentially to a circumference of the assembly, these recesses 45 being on alternate lateral sides 39 relative to the circumferential direction.

In practice there is an even number of recesses 45 on one of the lateral sides 39 (two, for example) and an odd number (one, for example) on the other.

In other words, the number of recesses 45 in one of these lateral sides 39 is one more than the number of recesses 45 in the other.

In spite of the alternating arrangement of these recesses 45, a symetrical arrangement of the elastic member 27 may in this way be retained, with a recess 45 in one of its lateral sides 39 situated on its median transverse plane. As previously, this advantageously enables it to be fitted either way round.

However, it is preferable for that of the lateral sides 39 comprising the greater number of recesses 45 to be that which is farthest away from the axis of the assembly in the radial direction.

In the embodiment shown the recesses 45 are of limited width and the depth P' of each is at least equal to one half the thickness E of the main part of the elastic member 27, being slightly greater than one half of this, for example.

As an alternative to this (FIGS. 10 through 14) the elastic member 27 comprises in each of its lateral sides 40 extending substantially transversely relative to the axis of the assembly at least one opening passing right through it, substantially parallel to said axis, this opening extending substantially the same distance to either side of its median plane M.

A plurality of such openings being provided in practice, each extends to substantially the same distance on either side of the median plane M of the elastic member 27, being in substantial alignment along said plane M.

Figure 10:
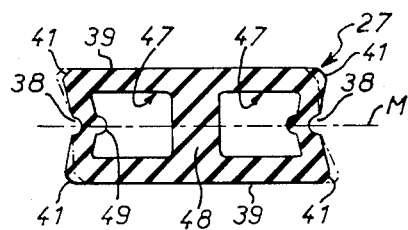
Figure 11:
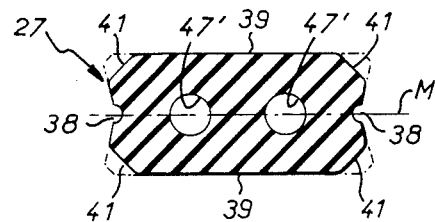
Figure 12:
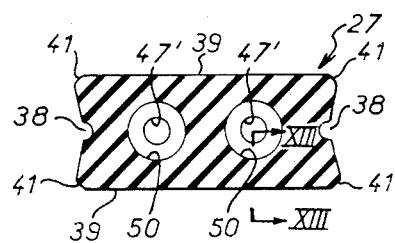
Figure 13:
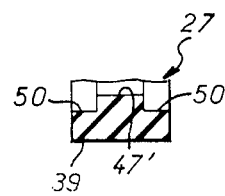
FIG. 13 is a partial view of the elastic centering member shown in FIG. 12 in transverse cross-section on the line XIII—XIII in FIG. 12.
Figure 14:
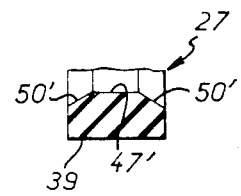
FIG. 14 is a view in transverse cross-section which, in like manner to FIG. 13, refers to an alternative embodiment.

The location of this median plane M is schematically represented in chain-dotted line in FIGS. 10 and 11.

In the embodiment specifically shown in figure 10, two openings 47 are provided in this way in the elastic member 27 and these openings have a generally polygonal contour in transverse cross-section, being separated from each other by a straight middle partition 48.

In practice the edges of an opening 47 of this kind near the lateral sides 39 of the elastic member 27 are substantially parallel thereto and their sides near the corresponding circumferential end of the elastic member 27 form a dihedron reflecting that formed by the circumferential end.

Also, in corresponding relationship to the recess 38 at each circumferential end of the elastic member 27 there is projecting inwardly into the opening 47 near this circumferential end a boss 49 the contour of which is substantially complementary to that of the recess 38.

In other words, ignoring the side defined by the straight middle partition 48, the sides of each of the openings 47 in the elastic member 27 are respectively deduced by simple translation of the corresponding sides of the elastic member 27.

As a result of this, at each circumferential end the elastic member 27 has the same thickness at all points and, ignoring the stright middle partition 48, it has the same thickness at all points along its lateral sides 39.

In other words, the elastic member 27 is of constant thickness at its circumferential ends and along its lateral sides 39.

This makes it easier to fabricate by molding.

Be this as it may, as schematically shown in chain-dotted line in FIG. 10 to openings 47 that it comprises also favor parallelogram-fashion deformation of the whole, which advantageously combines with its functioning in shear when in service.

Because the openings 47 are aligned with the median plane M, only the stiffness in this median plane M is reduced, retaining its full value along the lateral sides 39.

In the embodiments shown in FIGS. 11 through 14 two openings 47' are also provided but over part at least of their length these openings have a circular contour with their axis in the median plane M of the assembly.

In the embodiment shown in FIG. 11, the openings 47' have the same cross-section all along their length.

As an alternative to this (FIGS. 12 through 14) they widen towards at least one end, and in practice towards each end, either (FIGS. 12, 13) because circular contour holes 50 of greater diameter are provided at each end or (FIG. 14) by virtue of frustoconical holes 50'.

By virtue of openings that are tapered or staggered in this way, it is possible to achieve a certain degree of progressive stiffness.

It is to be understood that the present invention is not limited to the embodiments described and shown, but encompasses any variation as to execution and/or combination of the various components.

Figure 9:
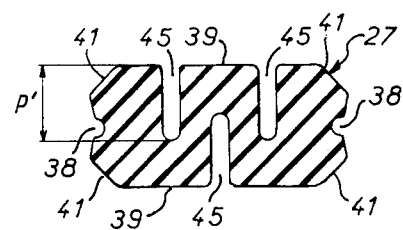

Also, and as shown in full line in FIGS. 9 and 11, the bevels 41 may be relatively accentuated or, as shown in full line in FIGS. 4, 8, 10 and 12, and as shown in chain-dotted line in FIG. 11, they may be relatively small.

Also, it goes without saying that in this context "elastic material" means a visco-elastic material, in practice rubber or an elastomer.

We claim:

1. Torsional damper device for an automotive vehicle clutch, wherein at least two coaxial parts are mounted to rotate relative to each other against circumferentially acting elastic means disposed therebetween within limits of relative angular movement determined by meshing means with clearance provided between the coaxial parts in cooperation with centering means adapted to urge the coaxial parts in the circumferential direction towards an intermediate rest position between the limits of relative angular movement, the centering means at least one elastic member constituting part of the circumferentially acting elastic means colocated with the meshing means with clearance of the coaxial parts and adapted, for the rest position of the latter, to bear at each circumferential end against shoulders of the coaxial parts which are oblique to each other as the flanks of a dovetail groove, at least one of said shoulders terminating in a sharp edge, the elastic member comprising a simple circumferentially elongated block of elastic material which is disposed chordally of the damper device, the circumferential ends of the elastic member being free of any covering and adapted to bear directly against the corresponding shoulders of the coxial parts between which said elastic member is circumferentially disposed, and an axial recess being disposed in the one of said circumferential ends of the elastic member facing said sharp edge for receiving the sharp edge so as to avoid contact between the sharp edge and the elastic member in the course of operation.

2. Torsional damper device according to claim 1, wherein both of said shoulders of said one of said coaxial parts terminate in sharp edges, and each of said circumferential ends has a said axial recess.

3. Torsional damper device according to calim 2, wherein each of said circumferential ends of the elastic member has a reentrant dihedron shape, said axial recesses being disposed at an intersection of sides of said reentrant dihedron.

4. Torsional damper device according to claim 2, wherein each of said recesses is generally semi-cylindrical with each recess having an axis parallel to an axis of the damper device.

5. Torsional damper device according to claim 4, wherein each of said recesses has a circular contour in transverse cross-section subtending at a center an angle greater than 180°.

6. Torsional damper device according to claim 1, wherein the elastic member has deep recesses extending inwardly from each of its generally circumferentially extending lateral sides, said recesses alternately opening on the respectively generally circumferentially entending lateral sides, each of said recesses being of limited width and extending beyond the median plane of the elastic member from the respective circumferentially extending lateral sides.

7. Torsional damper device according to claim 6, wherein there is an even number of said recesses on one of the circumferentially extending lateral sides of the elastic member and an odd number of the other circumferentially extending lateral side.

8. Torsional damper-device according to claim 1, wherein the elastic member has at least one through opening for reducing stiffness extending between generally radial sides thereof, said opening being substantially centered on a median plane of the elastic member passing through opposed circumferential ends of the elastic member.

9. Torsional damper device according to claim 8, wherein there is at least two of said through openings, each of said openings being substantially centered on said median plane of the elastic member.

10. Torsional damper device according to claim 7, wherein each of the circumferential ends of the elastic member forms a reentrant dihedron, a side of each of said openings adjacent the circumferential ends also forming a similar dihedron.

11. Torsional damper device according to claim 10, wherein said side of each of said through openings adjacent the circumferential ends of the elastic member has a boss projecting inside the openings substantially parallel and complementary to an axial recesss on said circumferential ends and on said median plane.

12. Torsional damper device according to claim 8, wherein said through opening has a generally polygonal transverse cross-section with sides substantially parallel to respective circumferential ends and circumferentially extending lateral sides of the elastic member.

13. Torsional damper device according to claim 12, wherein there are only two of said through openings, said openings being separated from one another by a straight middle partition which extends generally radially.

14. Torsional damper device according to claim 8, wherein said opening is at least partly of circular transverse cross-section, at least one end of said through opening being of enlarged transverse cross-section.

15. Torsional damper device according to claim 1, wherein the elastic member has beveled corners at junctions of the circumferential ends and circumferentially extending lateral sides, said beveled corners cooperating with concave arcuate portions of grooves in an outer one of the coaxial parts to prevent the elastic member from being expelled radially outwardly.

* * * * *